(12) United States Patent
Hsu

(10) Patent No.: US 6,462,890 B2
(45) Date of Patent: Oct. 8, 2002

(54) PROTECTIVE DISPLAY LENS FOR ELECTRONIC DEVICE

(75) Inventor: Che-Yuan Hsu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 16 days.

(21) Appl. No.: 09/738,903

(22) Filed: Dec. 13, 2000

(65) Prior Publication Data

US 2001/0055160 A1 Dec. 27, 2001

(30) Foreign Application Priority Data

Jun. 22, 2000 (TW) ........................................ 089112324

(51) Int. Cl.$^7$ ........................ G02B 9/08; G02B 27/00; G02F 1/1335; G09G 3/00
(52) U.S. Cl. ........................ 359/738; 359/613; 349/66; 345/32
(58) Field of Search ................................ 359/613, 738; 349/63, 66; 348/835; 345/32

(56) References Cited

U.S. PATENT DOCUMENTS

| | | | | |
|---|---|---|---|---|
| 3,037,419 A | * | 6/1962 | Nixon ........................ 359/613 |
| 3,524,789 A | * | 8/1970 | Olsen ........................ 428/118 |
| 5,204,160 A | * | 4/1993 | Rouser ....................... 428/167 |
| 5,528,319 A | * | 6/1996 | Austin ....................... 348/835 |
| 6,239,853 B1 | * | 5/2001 | Winker et al. .............. 349/117 |

* cited by examiner

Primary Examiner—Loha Ben
Assistant Examiner—David N. Spector
(74) Attorney, Agent, or Firm—Wei Te Chung

(57) ABSTRACT

A protective lens (10) for a display includes a transparent glass substrate (12) and a piece of filtering film (14) attached to an inner surface of the glass substrate. A plurality of parallel ink stripes (16) are formed on a surface of the film and are distributed symmetrically from a middle to opposite sides of the film in a predetermined pattern. A method for manufacturing the protective lens is also disclosed. The method includes the steps of (1) providing a mold having a plurality of recesses formed by etching a surface of the mold; (2) filling the recesses of the mold with ink; (3) positioning an elastically deformable body on the mold or attaching the ink in the recesses to the elastically deformable body; (4) positioning the elastically deformable body on a membrane to transfer the ink to the membrane, thereby forming a filtering film; (5) attaching the filtering film to a surface of the glass substrate.

1 Claim, 7 Drawing Sheets

PROTECTIVE DISPLAY LENS FOR ELECTRONIC DEVICE

BACKGROUND OF THE INVENTION

1. Field of the Invention

The present invention relates to an electronic device, such as a mobile phone, having a display for showing a user's private messages, and more particularly to a protective lens of the display for preventing light from the messages from being emitted outside of a predetermined central arc, thereby preventing the messages shown in the display from being observed by other people.

2. The Related Art

An electronic device, such as a mobile phone or a pager, usually has a display for showing text or image messages. The messages are displayed using a light source built into the electronic device. The display is covered by a lens for protection. A conventional lens is a transparent member allowing a user to read messages. The lens may also be formed with laser images to improve the visual effect, such as that disclosed in Taiwan patent application No. 87220130.

With the growing demand for personal privacy, it is becoming more desirable to have a lens that prevents people from seeing messages shown on a display except from a relatively narrow arc from which the user views the message. FIGS. 1 and 2 of the attached drawings disclose one such known lens 90. The lens 90 includes a flat, transparent glass plate 92 and a filtering film 94 adhering to an inner surface of the glass plate 92. The filtering film 94 is printed with a series of equally-spaced ink stripes 98 to block light from being transmitted through the lens 90 except in a narrow central arc, as is illustrated in FIG. 1. Thus a message shown on the display can not be seen from the sides outside of this arc.

A method of manufacturing the lens 90 will be explained with reference to FIG. 2. The method comprises the following steps: (1) directly printing ink stripes 98 on a film substrate 96; (2) cutting the film substrate 96 to form the filtering film 94; and (3) attaching the filtering film 94 to the glass plate 92.

However, this direct printing method is only adapted to a flat lens, because the ink stripes 98 are distributed in an equally spaced fashion.

The equally spaced distribution of ink stripes, however, is not suitable for a curved or arcuate lens because the distribution of distances between ink stripes must change for different locations on the arc of the lens to block light outside the same viewing arc as used with the flat lens.

SUMMARY OF THE INVENTION

Therefore, an object of the present invention is to provide a curved protective lens for a display which allows a user to readily read messages on the display while effectively preventing others from observing the messages.

Another object of the present invention is to provide a method for mass-producing display protective lens having different non-flat configurations.

These and other objects are achieved by a protective lens in accordance with the present invention. The protective lens includes a transparent glass substrate and a filtering film attached to an inner surface of the glass substrate. A plurality of parallel ink stripes are formed on a surface of the film and are distributed symmetrically from a middle to opposite sides according to a predetermined pattern. A method for manufacturing the protective lens is also disclosed. The method includes the steps of: (1) providing a mold having a plurality of recesses formed by etching a surface of the mold; (2) filling the recesses of the mold with ink; (3) pressing an elastically deformable body against the mold, thereby attaching the ink in the recesses to the elastically deformable body; (4) pressing the elastically deformable body against a membrane, thereby transferring the ink to the membrane, thus forming a filtering film; (5) attaching the filtering film to a surface of the glass substrate.

These and additional objects, features and advantages of the present invention will become apparent after reading the following detailed description of a preferred embodiment of the invention taken in conjunction with the appended drawings.

DETAILED DESCRIPTION OF THE PREFERRED EMBODIMENT

A protective lens in accordance with the present invention is attached to and covers a display of an electronic device (not shown), such as a mobile phone. The display normally shows text or image messages. The messages are displayed using a light source built into the electronic device. The light from the light source is selectively blocked to be visible only in a predetermined angular range, thereby preventing people other than the user from observing the messages.

Figure 1:
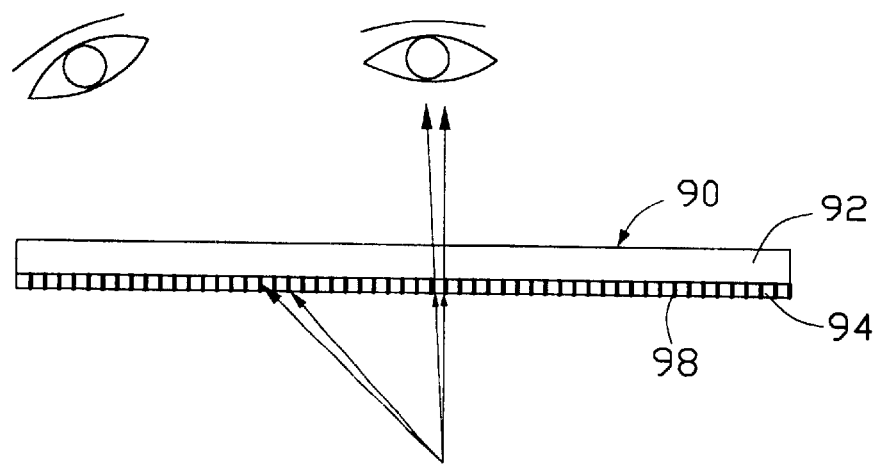
FIG. 1 is a schematic view showing a conventional protective lens.
Figure 2:
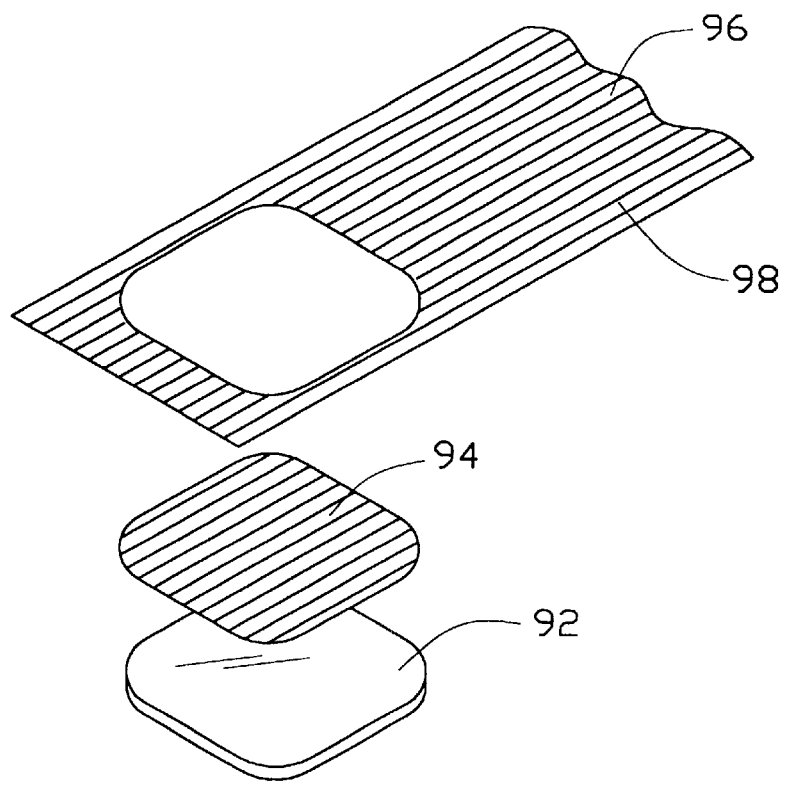
FIG. 2 schematically shows how to manufacture the conventional protective lens of FIG. 1.
Figure 3:
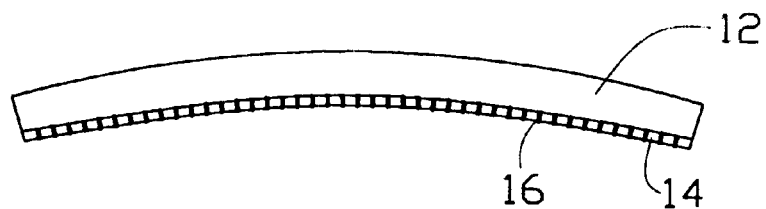
FIG. 3 is a sectional view of a protective lens in accordance with the present invention.
Figure 4:
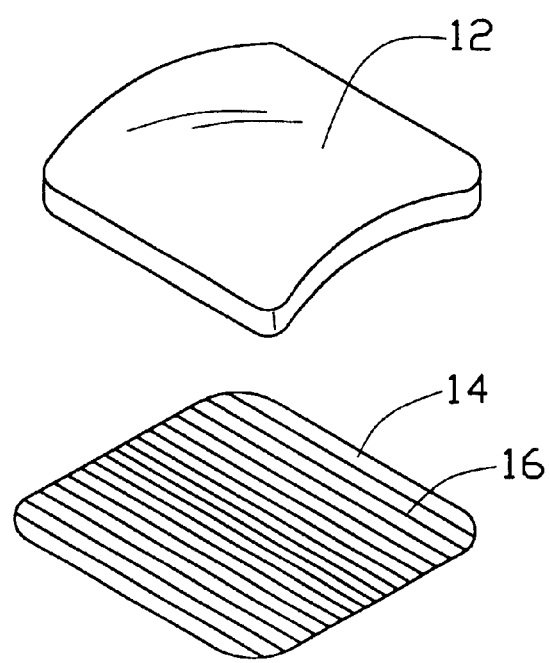
FIG. 4 is an exploded view of the protective lens of FIG. 3 comprising a transparent glass substrate and a filtering film.

Referring to FIGS. 3 and 4, a protective lens of the present invention, generally designated by reference numeral 10, comprises a transparent glass substrate 12 and a filtering film 14. The glass substrate 12 is appropriately shaped to match the configuration of the electronic device. The filtering film 14 is similarly shaped to match an inner contour of the glass substrate 12. The film 14 is attached to an inner surface of the glass substrate 12 by any suitable known means. The filtering film 14 has a plurality of ink stripes 16 spaced at unequal intervals. The intervals between the stripes 16 are arranged in accordance with a predetermined pattern and are distributed symmetrically from a middle to opposite sides. With this pattern of stripes 16, the intervals between stripes 16 at different locations along the arc of the glass substrate 12 changes so that light from a message shown on the display of the electronic device is blocked except in a narrow range viewed by the user. Therefore, the message can only be clearly seen from a particular, central range, making it difficult for bystanders to see the message.

If desired, an additional filtering film 14 may also be attached to an outer surface of the protective lens 10, but the intervals of the stripes 16 thereon must be correspondingly changed.

With reference to FIGS. 5–12, a process for making the lens 10 in accordance with the present invention will now be described.

Figure 5:
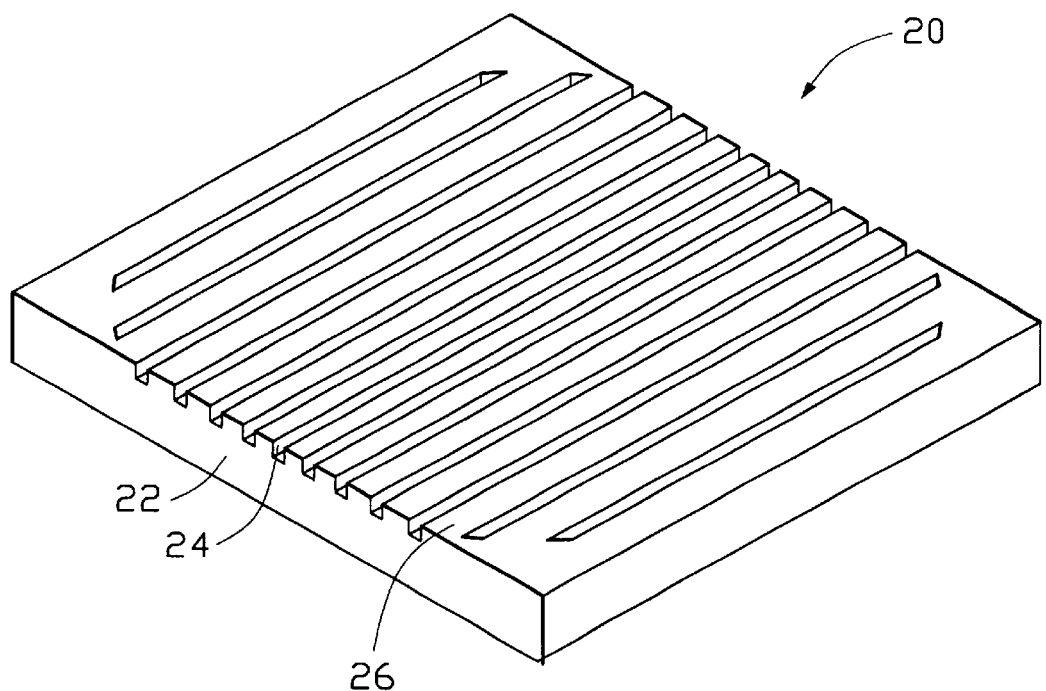
FIGS. 5–12 depict procedural steps in manufacturing the protective lens in accordance with the present invention.

In FIG. 5, a mold 20 for making the film 14 is formed by etching a metal plate 22, such as a steel plate, in an area comparable in size to the filtering film 14 to form a plurality of parallel recesses 24 therein. The pattern of intervals between the recesses 24 corresponds to the intervals between the ink stripes 16 of the filtering film 14. A surface of the mold 20 on which the recesses 24 are formed serves as a printing surface 26.

Figure 6:
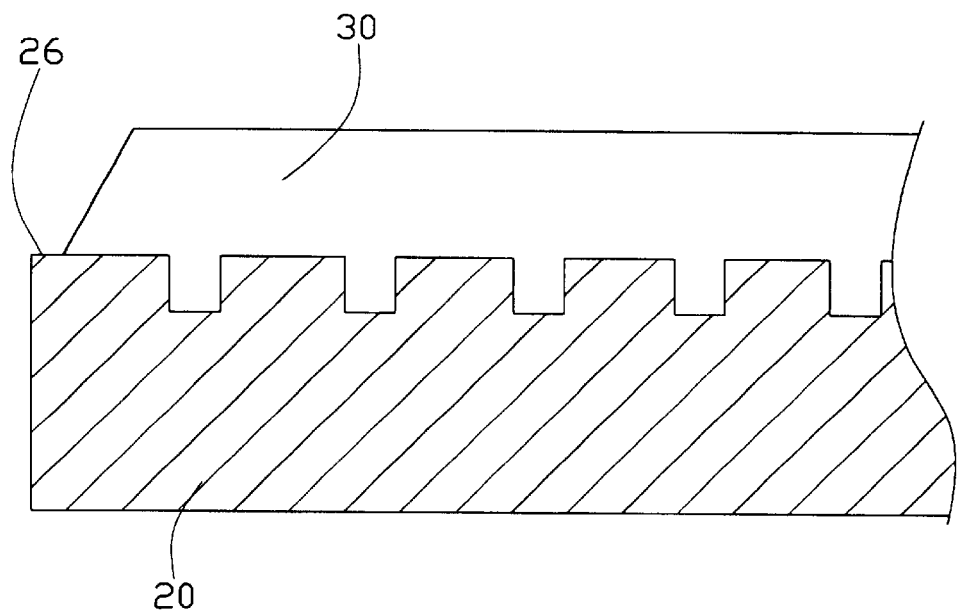

In FIG. 6, the printing surface 26 is flooded with ink 30. The ink 30 flows into and fills the recesses 24.

Figure 7:
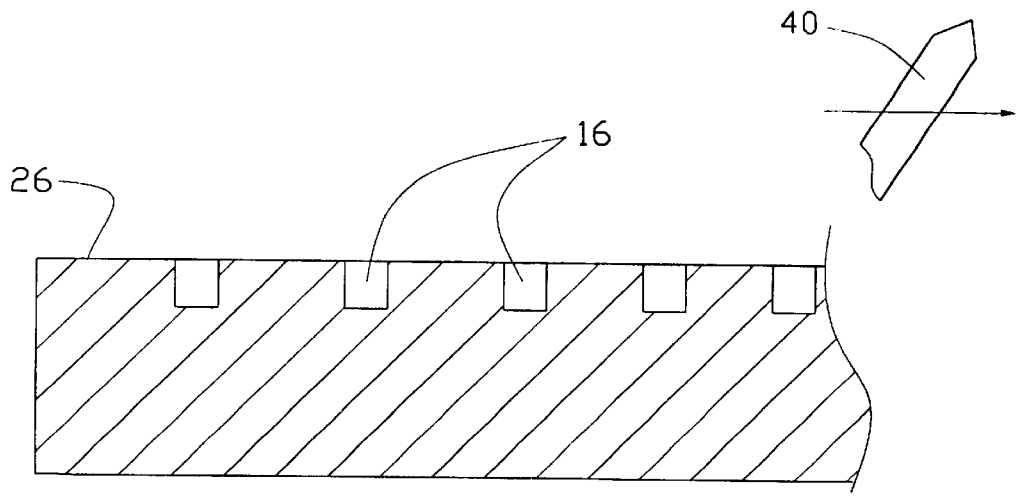

In FIG. 7, a blade 40 scraping over the printing surface 26 is used to remove excess ink 30.

Figure 8:
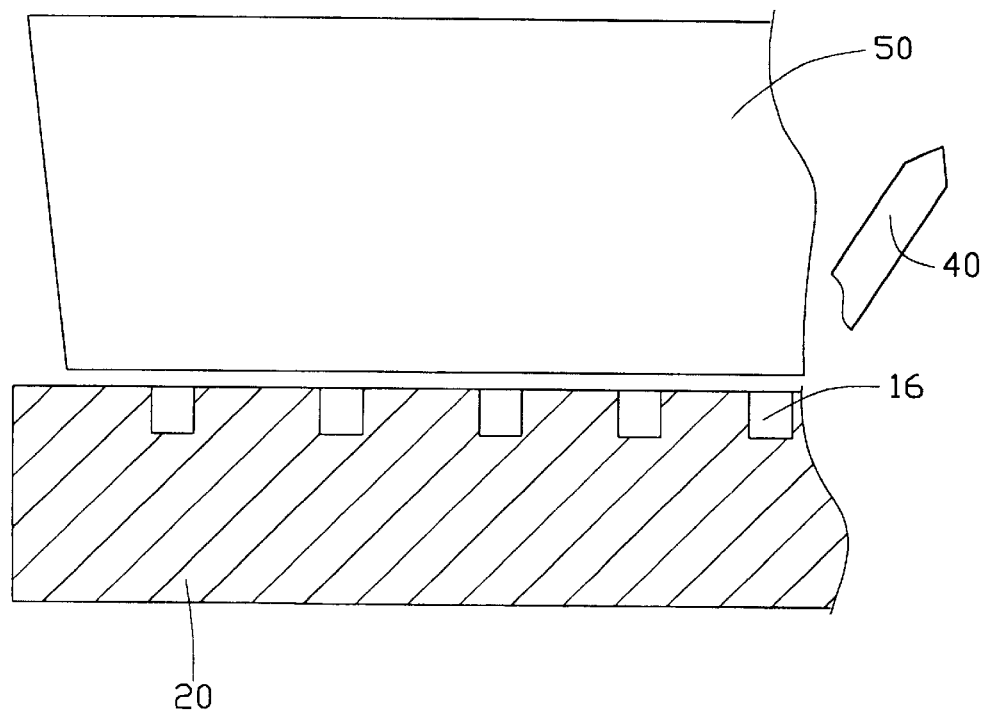

In FIG. 8, an elastically deformable body 50 is placed on the printing surface 26 and pressed thereagainst, whereby the ink retained in the recesses 24 is attached to a surface of the elastically deformable body 50, forming a pattern of ink stripes 16 thereon.

Figure 9:
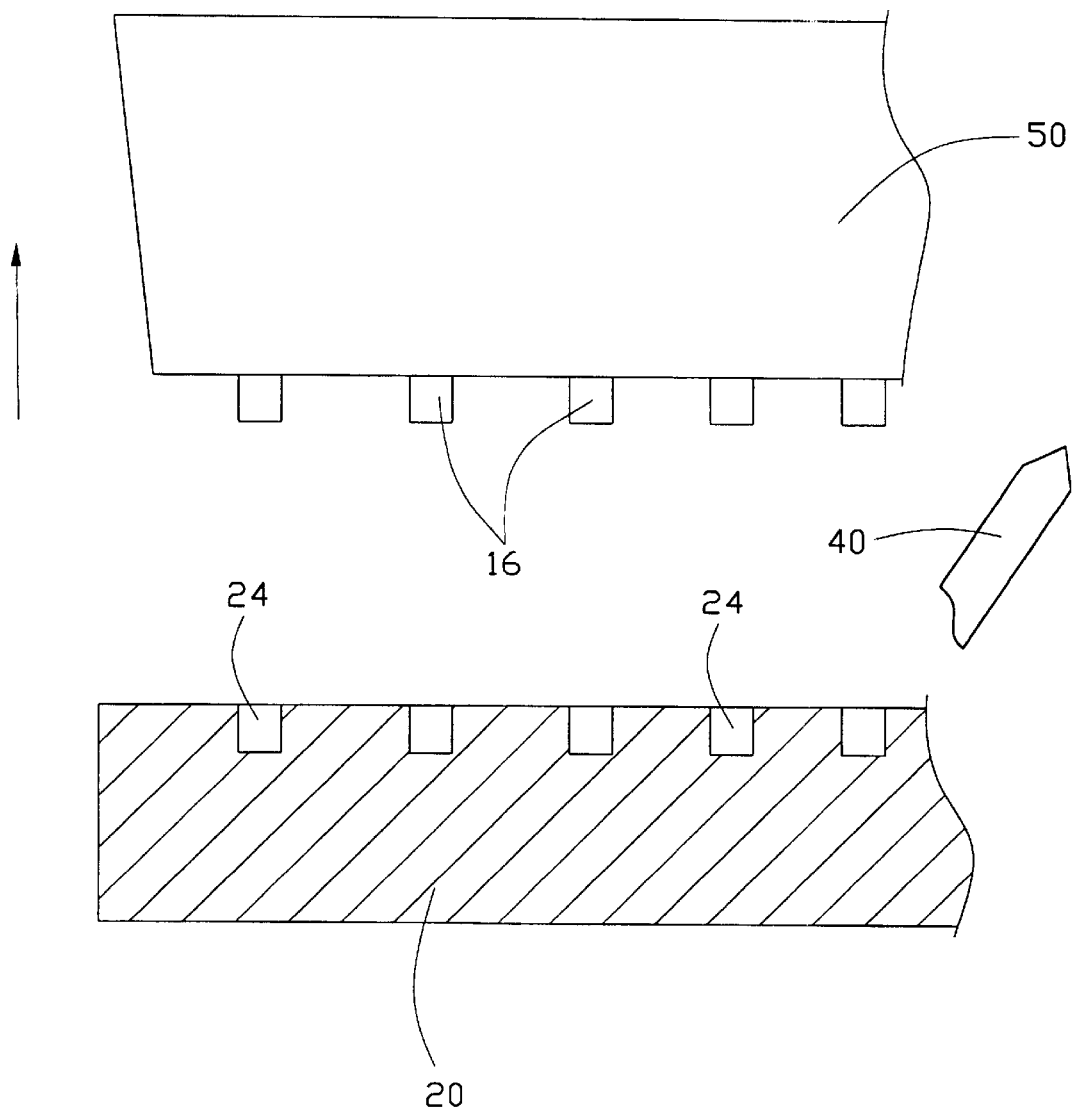

In FIG. 9, the elastically deformable body 50 is raised above the mold 20, lifting the ink stripes 16 from the recesses 24.

Figure 10:
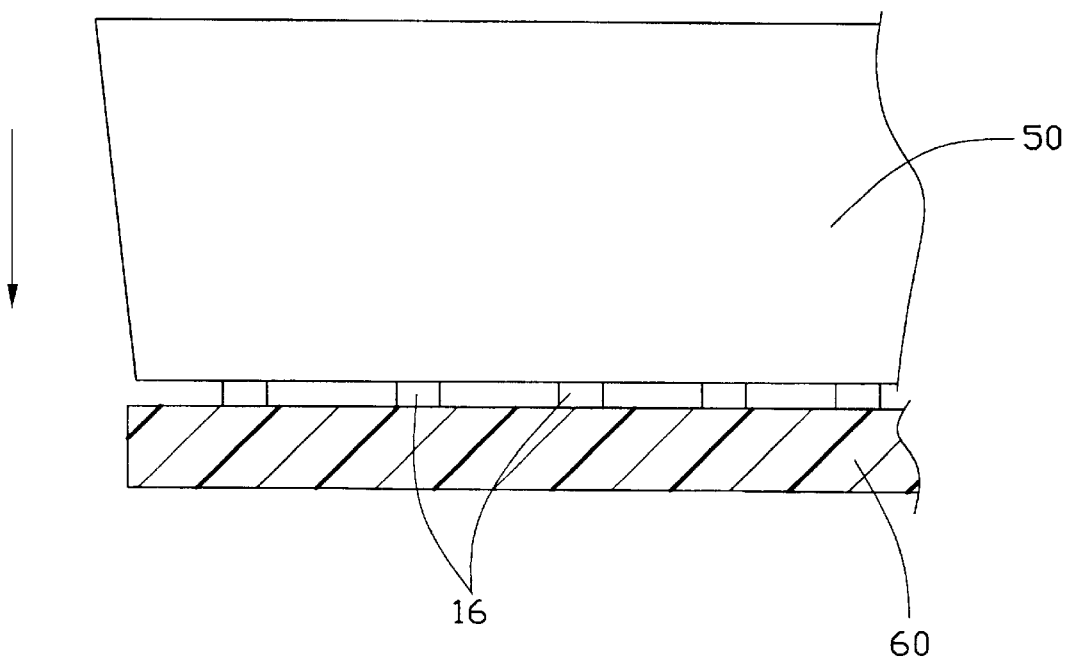

In FIG. 10, the elastically deformable body 50 with the ink stripes 16 adhered thereto, is positioned on a piece of membrane 60 that has been cut to the shape of the glass substrate 12 by stamping. The elastically deformable body 50 is now pressed against the membrane 60 to transfer the ink stripes 16 to the membrane 60.

Figure 11:
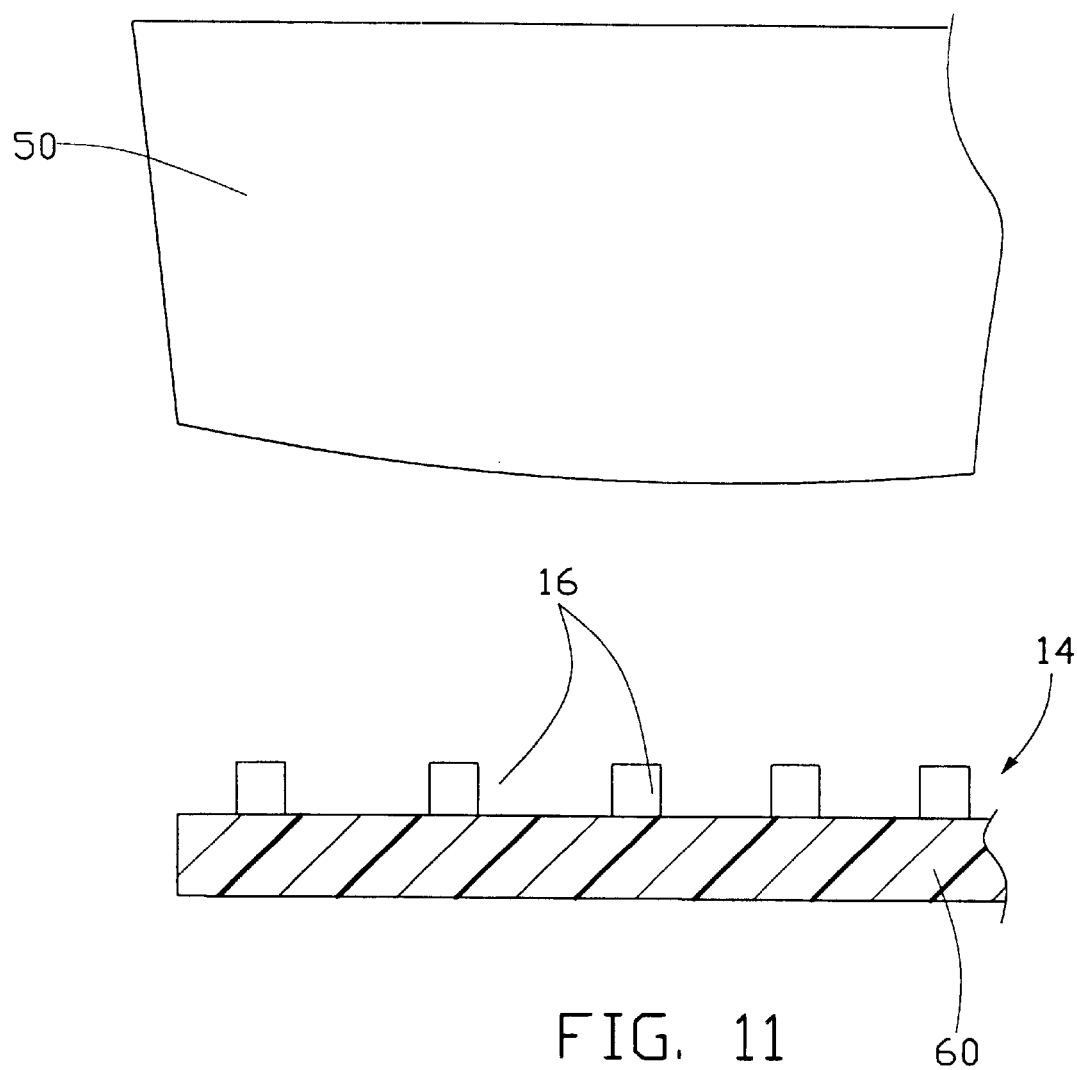

In FIG. 11, the elastically deformable body 50 is removed, with the ink stripes 16 remaining adhered to the membrane 60, whereby the filtering film 14 is completely formed.

Figure 12:
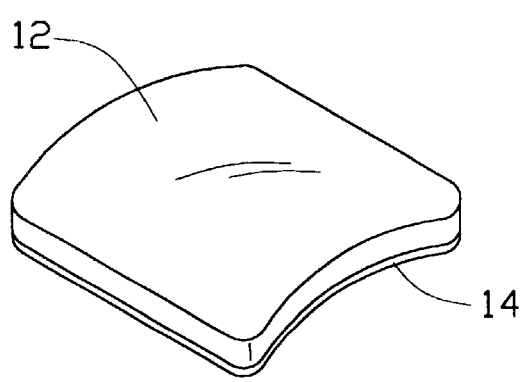

In FIG. 12, by attaching the filtering film 14 to the inner surface of the glass substrate 12, the protective lens 10 is completed.

From the above description, it is obvious that once the mold 20 is made, the filtering film 14 can be mass produced following the process shown in FIGS. 6–11. The lens 10 can similarly be mass produced. As the intervals between the ink stripes 16 are determined by the distances between the etched recesses 24 in the printing surface 26, they can be readily controlled by mean of the etching process. Therefore, the present invention can overcome the problems associated with conventional technology.

While the present invention has been described with reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

I claim:

1. A protective lens adapted to cover a display on an electronic device comprising: a transparent glass substrate having one concave optical surface and one convex optical surface; and a film substrate having a plurality of unequally spaced ink stripes disposed thereupon to form a filtering film, which is attached to the surface of the glass substrate; wherein said ink stripes are distributed on an optical surface of said filtering film according to a predetermined pattern symmetrically disposed about a line bisecting the filtering film and extending to each of two opposite sides thereof; and, wherein said predetermined pattern is disposed on said optical surface such that light emitted from a light source disposed on a concave side of the glass substrate is blocked from transmission through the glass substrate by said ink stripes, except in a narrow arc extending to either side of the line bisecting said filtering film.

* * * * *